United States Patent
Li et al.

(10) Patent No.: US 10,498,723 B2
(45) Date of Patent: Dec. 3, 2019

(54) METHOD, AND APPARATUS FOR AUTHENTICATING ACCESS

(71) Applicant: Xiaomi Inc., Beijing (CN)

(72) Inventors: Feiyun Li, Beijing (CN); Ziguang Gao, Beijing (CN); Qiao Ren, Beijing (CN)

(73) Assignee: Xiaomi Inc., Beijing (CN)

( * ) Notice: Subject to any disclaimer, the term of this patent is extended or adjusted under 35 U.S.C. 154(b) by 449 days.

(21) Appl. No.: 15/233,212

(22) Filed: Aug. 10, 2016

(65) Prior Publication Data
US 2016/0352723 A1    Dec. 1, 2016

Related U.S. Application Data

(63) Continuation of application No. PCT/CN2015/074876, filed on Mar. 23, 2015.

(30) Foreign Application Priority Data

Aug. 15, 2014    (CN) .......................... 2014 1 0403939

(51) Int. Cl.
*H04L 29/06*    (2006.01)
*H04W 12/06*    (2009.01)

(52) U.S. Cl.
CPC ........ *H04L 63/083* (2013.01); *H04L 63/0853* (2013.01); *H04W 12/06* (2013.01)

(58) Field of Classification Search
CPC ... H04L 63/0853; H04L 63/083; H04W 12/06
USPC .......................................................... 726/4
See application file for complete search history.

(56) References Cited

U.S. PATENT DOCUMENTS

2014/0098247 A1    4/2014   Rao et al.
2016/0241543 A1*   8/2016   Jung ..................... H04L 63/083

FOREIGN PATENT DOCUMENTS

CN    103078875 A    5/2013
CN    103761597 A    4/2014
CN    104202306 A    12/2014

OTHER PUBLICATIONS

International Search Report in Chinese dated Mar. 23, 2015, in PCT Application No. PCT/CN2015/074876.

* cited by examiner

*Primary Examiner* — Kambiz Zand
*Assistant Examiner* — Benjamin A Kaplan
(74) *Attorney, Agent, or Firm* — Oblon, McClelland, Maier & Neustadt, L.L.P.

(57) ABSTRACT

The present disclosure relates to a method, apparatus and system for authenticating access of a first device with a first user account to a second device with a device identification bound with a second user account. The method includes acquiring, by the first device, the device identification of the second device to by accessed. Subsequently, the method includes sending the device identification and the first user account to a third-party device. The third-party device receives the device identification and the first user account, sends an authentication request to a login terminal for the second user account when the first user account is different from the second account, receives a permission access response for an access authorization front the login terminal, and sends an access password associated to the first device. Then, the method includes receiving the access password, and accessing the second device using the access password.

10 Claims, 11 Drawing Sheets

METHOD, AND APPARATUS FOR AUTHENTICATING ACCESS

The present application is a continuation of International Application No. PCT/CN2015/074876, filed on Mar. 23, 2015, which is based upon and claims priority to Chinese Patent Application No. 201410403939.2, filed on Aug. 15, 2014, the entire contents of which are incorporated herein by reference.

TECHNICAL FIELD

The present disclosure relates to a field of computer technology, and more particularly to a method, apparatus and system for authenticating access.

BACKGROUND

With the popularity of Wi-Fi (Wireless-Fidelity), smart devices with Wi-Fi are more and more. A typical Wi-Fi smart device needs to cooperate with a mobile phone App (Application) for use after connecting to a network, the mobile phone App may view the state and result of the smart device, and may send instructions to control the smart device. And a particularly important problem for the smart device is how to authenticate the mobile phone App, so that the mobile phone App may safely access and control the smart device.

A method for authenticating access provided in the related art is that: when a user accesses the Wi-Fi smart device through the mobile phone App, the user needs to manually enter an access password on the mobile phone App, the mobile phone App sends the access password entered by the user to the Wi-Fi smart device, and the Wi-Fi smart device allows the mobile phone App to access after the access password is successfully matched.

In the process of implementing the present disclosure, it is found by the inventor that at least the following problems existing in the related art: since the user needs manually enter the access password on the mobile phone App, an illegal user may easily acquire the access password, and use the access password to access the Wi-Fi smart device, and thus the security is relatively poor.

SUMMARY

The present disclosure provides a method, apparatus and system for authenticating access for solving the technical problem of the relatively poor security in the related art that an illegal user may easily acquire the access password and use the access password to access the Wi-Fi smart device since the user needs manually enter the access password on the mobile phone App.

Aspects of the disclosure provide a method for authenticating access of a first device with a first user account to a second device with a device identification bound with a second user account. The method includes acquiring, by the first device, the device identification of the second device to be accessed by the first device with the first user account. The device identification of the second device is bound with the second user account. Subsequently, the method includes sending the device identification and the first user account of the first device to a third-party device. The third-party device receives the device identification and the first user account of the first device, sends an authentication request to a login terminal for the second user account bound with the device identification when the first user account is different from the second user account, receives a permission access response for an access authorization from the login terminal in response to the authentication request, and sends an access password associated with the device identification to the first device to authorize an access. Then, the method includes receiving, by the first device, the access password, and accessing the second device according to the access password.

To acquire the device identification of the second device to be accessed by the first device with the first user account, in an example, the method includes receiving a broadcast message carrying the device identification of the second device sent from the second device by a way of broadcast, and acquiring the device identification of the second device from the broadcast message; or acquiring the device identification of the second device by scanning, a graphic code of the second device.

Aspects of the disclosure provide a method for authenticating access by a first device with a first user account to a second device with a second user account. The method includes receiving, by the second device, an access password send from the first device. The access password is provided to the first device by a third-party device. In an example, the third-party device receives a device identification of the second device to be accessed and the first user account of the first device from the first device, sends an authentication request to a login terminal for the second user account bound with the device identification when the first user account is different from the second user account, receives a permission access response for an access authorization from the login terminal in response to the authentication request, and sends the access password associated with the device identification to the first device to authorize an access. Then, the method includes detecting, by the second device, whether the received access password which is a first access password matches a second access password generated by the second device and allowing the first device to access the second device when the first access password matches the second access password generated by the second device.

Further, in an embodiment, the method includes, generating, by the second device, the second access password; and sending the second access password and the device identification of the second device to the third-party device, so that the third-party device stores the second access password associated with the device identification. In addition, in an example, the method includes periodically changing, by the second device, the second access password to obtain an updated second access password and sending the updated second access password and the device identification of the second device to the third-party device, so that the third-party device stores the updated second access password associated with the device identification.

Aspects of the disclosure provide another method for authenticating access by a first device with a first user account to a second device with a second user account. The method includes receiving, by a third-party device, a device identification of the second device and the first user account of the first device sent from the first device, and sending an authentication request to a login terminal of the second user account bound with the device identification when the first user account is different from the second user account that is bound with the device identification of the second device. The authentication request is used to request for allowing the first device to access the second device. Further, the method includes receiving, by the third-party device, a permission access response from the login terminal in response to the authentication request, the permission access response authorizing an access by the first device to the second device, and sending an access password associated with the device identification to the first device, wherein the first device accesses the second device according to the access password.

Further, in an embodiment, the method includes detecting whether the device identification of the second device is bound with any user account, and binding the device identification with the first user account of the first device to assign the first device as the login terminal for the second device when the device identification is not bound with any user account.

In an example, the method includes detecting whether the first user account of the first device is the same as the second user account bound with the device identification when the device identification is bound with the second user account, and sending the authentication request to the login terminal of the second user account bound with the device identification when the first user account of the first device is different from the second user account bound with the device identification.

To send the access password associated with the device identification to the first device, in an example, the method includes sending the access password associated with the device identification to the first device when the first user account of the first device is the same as the second user account bound with the device identification.

According to an aspect of the disclosure, the method can include receiving the access password and the device identification of the second device sent from the second device, and storing the access password associated with the device identification of the second device when no access password is bound with the device identification of the second device. Further, the method includes detecting whether the received access password which is a second access password matches a first access password that is bound with the device identification of the second device in the third-party device, and binding the second access password with the device identification when the second access password is different from the first access password.

Aspects of the disclosure provide a system for authenticating access. The system includes a first device with a first user account, a second device with a device identification bound with a second user account and a third-party device. The first device is configured to acquire the device identification of the second device to be accessed by the first device with the first user account and send the device identification and the first user account of the first device to the third-party device. The third-party device is configured to receive the device identification and the first user account of the first device, send an authentication request to a login terminal for the second user account bound with the device identification when the first user account is different from the second user account, receive a permission access response for an access authorization from the login terminal in response to the authentication request, and send a first access password associated with the device identification to the first device to authorize an access. The first device accesses the second device according to the first access password. The second device is configured to detect whether the first access password matches a second access password generated by the second device, and allow the first device to access the second device when the first access password matches the second access password generated by the second device.

Aspects of the disclosure provide an apparatus for authenticating access. The apparatus is a first device that includes a processor; and a memory for storing instructions executable by the processor. The processor is configured to perform acquiring a device identification of a second device to be accessed by the first device with a first user account, the device identification of the second device being bound with a second user account, sending the device identification and the first user account of the first device to a third-party device, and receiving an access password from the third-party device, and accessing the second device according to the access password. The third-party device receives the device identification and the first user account of the first device sends an authentication request to a login terminal for the second user account bound with the device identification when the first user account is different from the second user account, receives a permission access response for an access authorization from the login terminal in response to the authentication request, and sends the access password associated with the device identification to the first device to authorize an access.

Aspects of the disclosure provide an apparatus for authenticating access by a first device with a first user account to the apparatus which is a second device with a second user account. The second device includes a processor and a memory for storing instructions executable by the processor. The processor is configured to perform: receiving, by the second device, an access password send from the first device, wherein the access password is provided to the first device by a third-party device. The third-party device receives a device identification of the second device to be accessed and the first user account of the first device from the first device, sends an authentication request to a login terminal for the second user account bound with the device identification when the first user account is different from the second user account, receives a permission access response for an access authorization from the login terminal in response to the authentication request, and sends the access password associated with the device identification to the first device to authorize an access. Then, the processor is configured to perform allowing the first device to access the second device when detecting that the access password matches another access password generated by the second device.

Aspects of the disclosure provide an apparatus for authenticating access by a first device with a first user account to a second device with a second user account. The apparatus is a third-party device and includes a processor and a memory for storing instructions executable by the processor. The processor is configured to perform receiving, by the apparatus which is a third-party device, a device identification of the second device and the first user account of the first device sent from the first device, sending an authentication request to a login terminal of the second user account bound with the device identification when the first user account is different from the second user account that is bound with the device identification of the second device, wherein the authentication request is used to request for allowing the first device to access the second device, receiving a permission access response from the login terminal in response to the authentication request, the permission access response authorizing an access by the first device to the second device, and sending an access password associated with the device identification to the first device, wherein the first device accesses the second device according to the access password.

It is to be understood dial both the foregoing general description and the following detailed description are exemplary and explanatory only and are not restrictive of the invention, as claimed.

BRIEF DESCRIPTION OF THE DRAWINGS

The accompanying drawings, which are incorporated m and constitute a part of this specification, illustrate embodiments consistent with the invention and together with the description, serve to explain the principles of the invention.

DESCRIPTION OF THE EMBODIMENTS

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1:
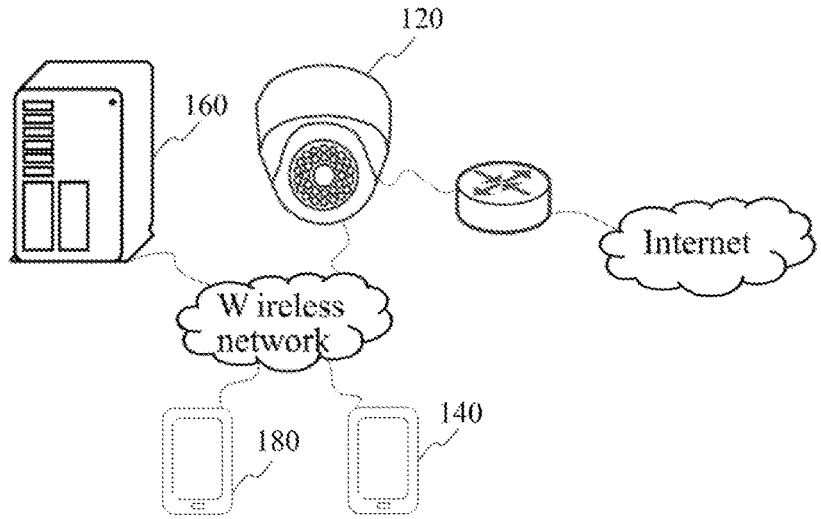
FIG. 1 is a diagram showing an implement environment involved in A method for authenticating access according to part of exemplary embodiments.

FIG. 1 is a diagram showing an implement environment involved in a method for authenticating access according to a part of exemplary embodiments as shown in FIG. 1, the implement environment may include an accessed device 120 (a second device), an access device 140 (a first device), a third-party device 160 and a login terminal 180.

The accessed device 120 may be a smart device with Wi-Fi, and the smart device may be a camera, a router, a smart TV, and the like. The accessed device 120 has a function of restoring factory settings, which may release a user account bound with the accessed device 120. The accessed device 120 may be connected to Internet via the router.

The access device 140 may be an electronic device that may be able to install App, the electronic device may be a smart mobile phone, a tablet, a smart IV, an eBook reader, a MP4 (Moving Picture Experts Croup Audio Layer IV) player, laptop computer and a desktop computer and the like.

The third-party device 160 may be a server, a router, and the like, which may have functions of binding, authenticating, and the like. When the third-party device 160 is a server, it may be a server, or a server cluster composed of several servers, or a cloud computing service center.

The login terminal 180 may be an electronic device that may be able to install App, the electronic device may be a smart mobile phone, a tablet, a smart TV, an eBook reader, a MP4 (Moving Picture Experts Group Audio Layer IV) player, laptop computer and a desktop computer and the like. The user account logged on the login terminal 180 has owner permission to the accessed device 120.

The accessed device 120, the access device 140, the third-party device 160 and the login terminal 180 may be connected through a wireless network, which may be Wi-Fi, Bluetooth, infrared, and the like.

Figure 2:
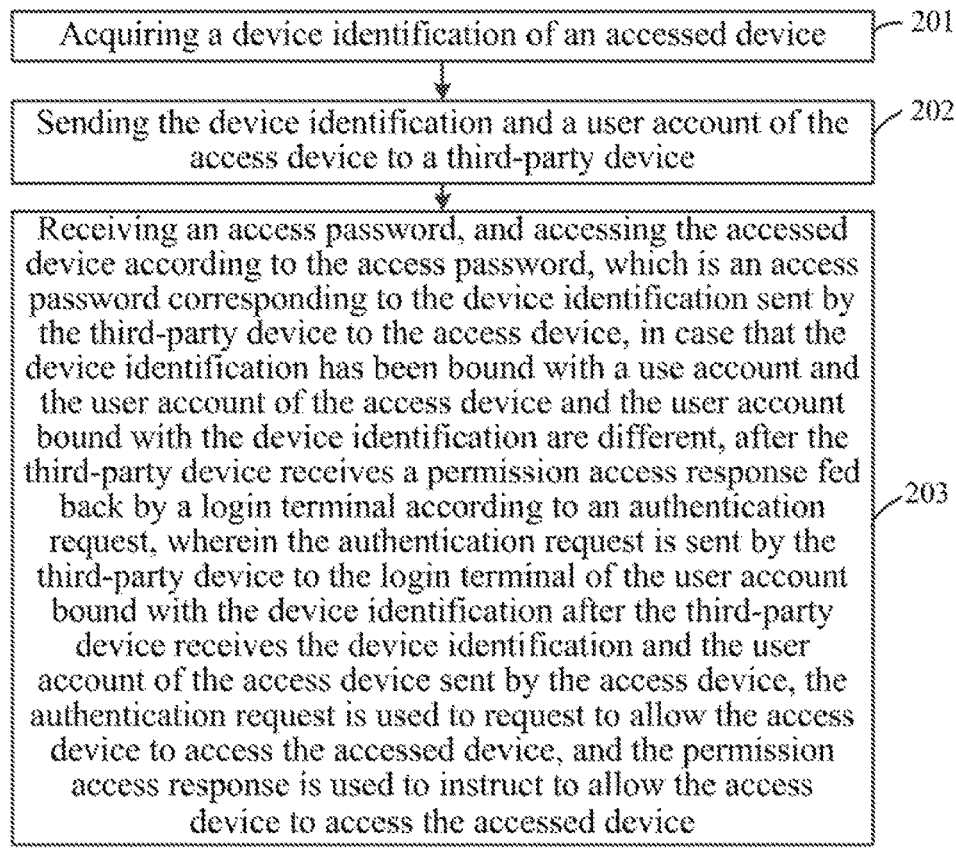
FIG. 2 is a flow chart showing a method for authenticating access according to an exemplary embodiment.

FIG. 2 is a flow chart showing a method for authenticating access according to an exemplary embodiment. As shown in FIG. 2, the method for authenticating access is applied in the access device 140 in the implement environment shown in FIG. 1, and includes the following steps.

In step 201, a device identification of an accessed device is acquired.

In step 202, the device identification and a user account of the access device is sent to a third-party device.

In step 203, an access password is received, and the accessed device is accessed according to the access password, which is an access password corresponding to the device identification sent by the third-party device to the access device, in case that the device identification has been bound with a use account and the user account of the access device is different from the user account bound with the device identification, after the third-party device receives a permission access response fed back by a login terminal according to an authentication request, wherein the authentication request is sent by the third-party device to the login terminal of the user account bound with the device identification after the third-party device receives the device identification and the user account of the access device sent by the access device, the authentication request is used to request for allowing the access device to access the accessed device, and the permission access response is used to instruct to allow the access device to access the accessed device.

The authentication request herein is used to request for allowing the access device to access the accessed device, and the permission access response is used to instruct to allow the access device to access the accessed device.

Accordingly, the method for authenticating access provided in the embodiments of the present disclosure acquires a device identification of the accessed device by using the access device, sends the device identification and a user account of the access device to a third-party device, receives an access password sent by the third-party device, and accesses the accessed device according to the access password after the third-party device inquires of a login terminal and determines to allow the access device to access the accessed device. Therefore, it may solve the problem of the relatively poor security that an illegal user easily acquires the access password and use the access password to access the Wi-Fi smart device since the user needs manually input the access password in the mobile phone App, thus improving the security of the accessed device.

Figure 3:
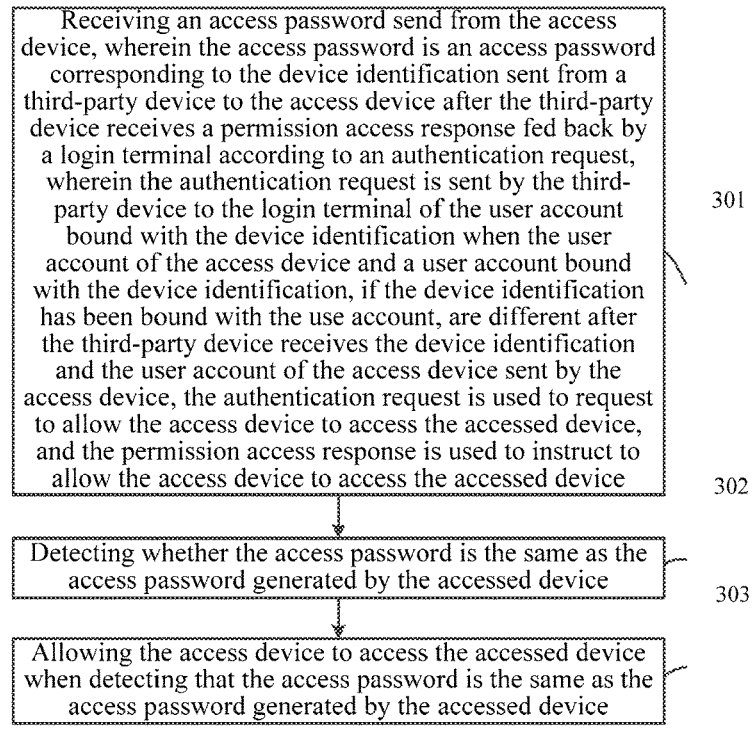
FIG. 3 is a flow chart showing a method for authenticating access according to another exemplary embodiment.

FIG. 3 is a flow chart showing a method for authenticating access according to another exemplary embodiment. As shown in FIG. 3, the method for authenticating access is applied in the accessed device 120 in the implement environment shown in FIG. 1, and includes the following steps.

In step 301, an access password sent by an access device is received, which is an access password corresponding to the device identification sent by the third-party device to the access device, in case that the device identification has been bound with a use account and the user account of the access device is different from the user account bound with the device identification, after the third-party device receives a permission access response fed back by a login terminal according to an authentication request, wherein the authentication request is sent by the third-party device to the login terminal of the user account bound with the device identification after the third-party device receives the device identification and the user account of the access device sent by the access device.

The authentication request herein is used to request for allowing the access device to access the accessed device, and the permission access response is used to instruct to allow the access device to access the accessed device.

In step 302, whether the access password is the same as the access password generated by the accessed device is detected.

In step 303, the access device is allowed to access the accessed device when detecting that the access password is the same as the access password generated by the accessed device.

Accordingly, the method for authenticating access provided in the embodiments of the present disclosure receives the access password sent by the access device and allows the access device to access the accessed device after detecting that the received access password is the same as the access password generated by the accessed device. Since the access device is allowed to access only when the accessed device verifies that the received the access password is the same as the generated access password, it may solve the problem of the relatively poor security that the access device may still access the accessed device if the access password does not be verified in case that the access password is changed, thus improving the security of the accessed device.

Figure 4:
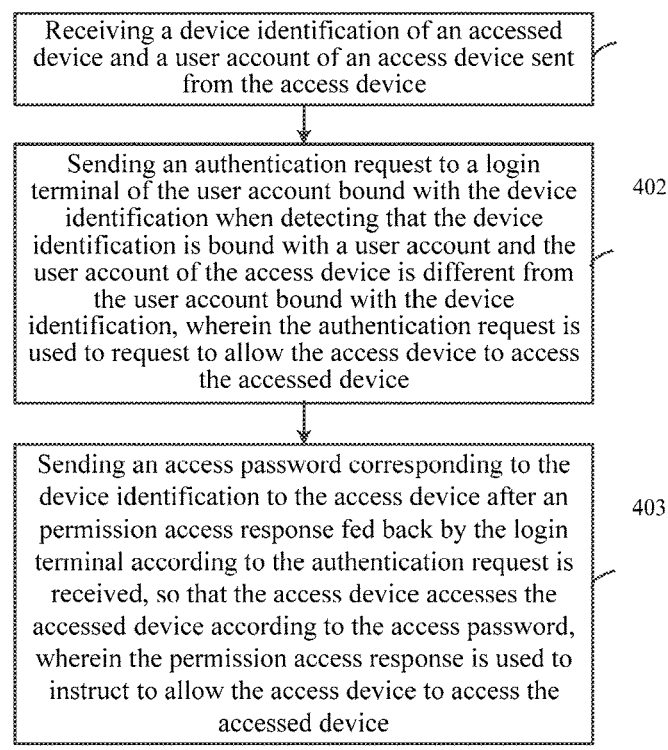
FIG. 4 is a flow chart showing a method for authenticating access according to a further exemplary embodiment.

FIG. 4 is a flow chart showing a method for authenticating access according to a further exemplary embodiment. As shown in FIG. 4, the method for authenticating access is applied in the third-party device 160 in the implement environment shown in FIG. 1, and includes the following steps.

In step 401, a device identification of an accessed device and a user account of an access device sent by the access device are received.

In step 402, an authentication request is sent to a login terminal of the user account bound with the device identification when detecting that the device identification has been bound with a user account and the user account of the access device is different from the user account bound with the device identification.

The authentication request herein is used to request for allowing the access device to access the accessed device.

In step 403, an access password corresponding to the device identification is sent to the access device after a permission access response fed back by the login terminal according to the authentication request is received, so that the access device accesses the accessed device according to the access password.

The permission access response herein is used to instruct to allow the access device to access the accessed device.

Accordingly, the method for authenticating access provided in the embodiments of the present disclosure receives the device identification and the user account of the access device sent by the access device, sends the authentication request to the login terminal after detecting that the device identification is bound, and sends an access password corresponding to the device identification to the access device after receiving the permission access response fed back by the login terminal. Since the third-party may send the access password to the access device after allowed by the login terminal, it may solve the problem of the relatively poor security that an illegal user may easily acquire the access password, and use the access password to access the Wi-Fi smart device, thus improving the security of the accessed device.

Before the access device accesses the accessed device, the accessed device needs generate the access password, and send the generated access password and the device identification of the accessed device to the third-party device to bind them. When a first access device accesses the accessed device, the third-party device binds the user account of the access device with the device identification of the accessed device, so that the user account obtains the owner permission of the accessed device. The specific implementation procedures refer to FIG. 5A.

Figure 5A:
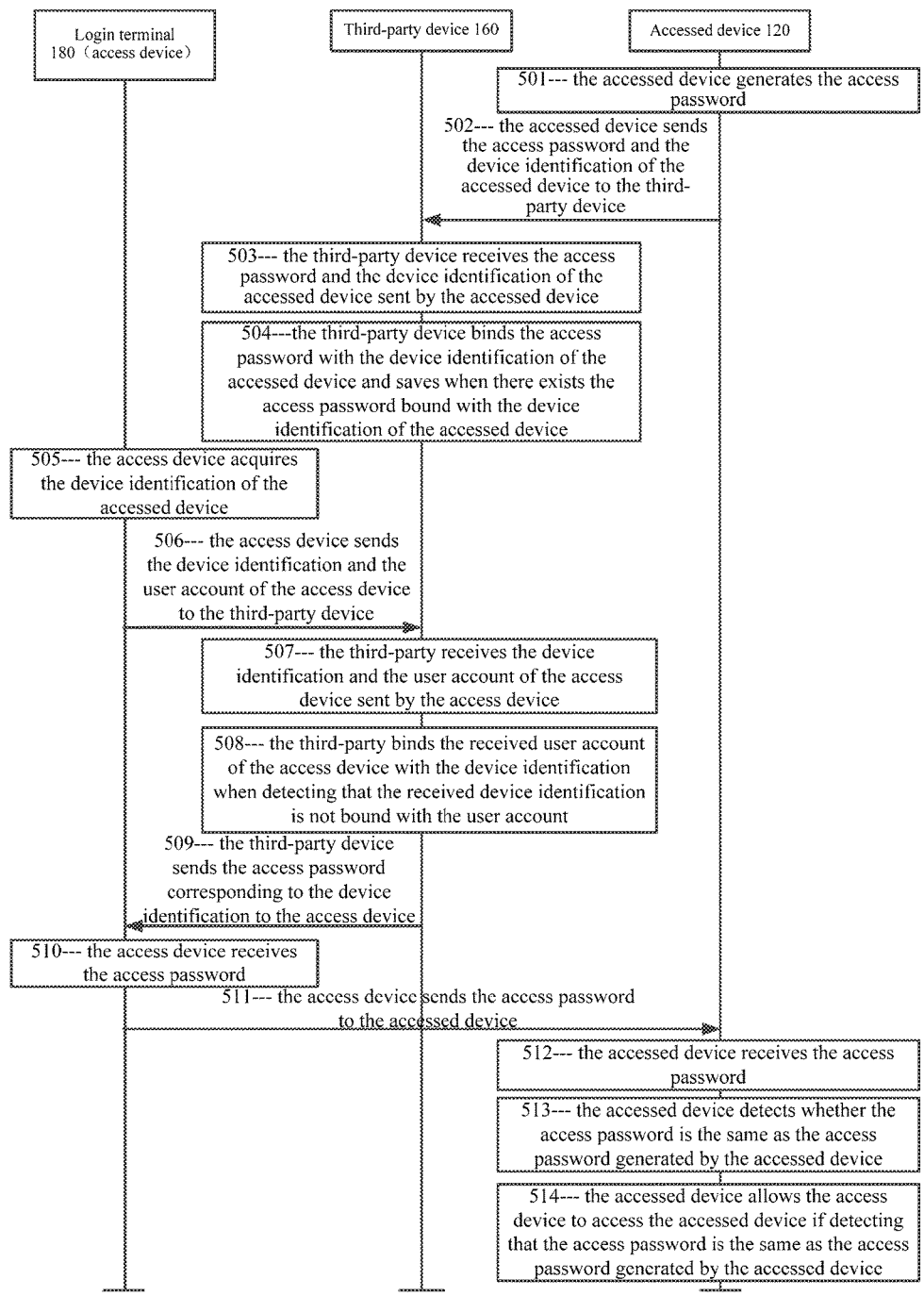
FIG. 5A is a flow chart showing a method for authenticating access according to a further exemplary embodiment.

FIG. 5A is a flow chart showing a method for authenticating access according to a further exemplary embodiment. As shown in FIG. 5, the method for authenticating access is applied in the implement environment shown in FIG. 1, and includes the following steps.

In step 501, the accessed device generates the access password.

Alternatively, the accessed device may randomly generate the access password.

Alternatively, the accessed device may periodically change the access password, or change the access password of the accessed device after receiving an instruction of changing access password sent by the login terminal corresponding to the accessed device.

In step 502, the accessed device sends the access password and the device identification of the accessed device to the third-party device.

The device identification herein which uniquely identifies the accessed device may be generated when the accessed device is generated. In a practical application, the device identification may be a string which may be composed of at least one of numbers, letters, or other types of characters.

Alternatively, in order to ensure the security of the access password, the accessed device may send the generated access password and the device identification to the third-party device through an encrypted channel, wherein the encrypted channel may reduce the possibility of leaking the access password.

In step 503, the third-party device receives the access password and the device identification of the accessed device sent by the accessed device.

In step 504, the third-party device binds and stores the access password and the device identification of the accessed device when there is the access password bound with the device identification of the accessed device.

The third-party device firstly detects whether the device identification is bound with the access password after the access password and the device identification of the accessed device sent by the accessed device are received, and if detecting that the received device identification is not bound with the access password, the received access password and the device identification are bound and saved.

In a case, in order to ensure the security, the accessed device may change the bound access password at any time, that is, the accessed device may firstly periodically change the access password, obtain the changed access password, and send the changed access password and the device identification of the accessed device to the third-party device; the third-party device detects whether the received access password is the same as the bound access password when detecting that there exists the bound access password with the received device identification. If the received access password is the same as the bound access password, the third-party device takes no operation, and if the received access password is different from the bound access password, the third-party device releases the binding between the bound access password and the device identification, and binds and saves the received access password and the device identification. That is, after the third-party device receives the access password and the device identification sent by the accessed device, if detecting that the access password is different from the access password bound with the device identification, the pre-stored access password bound with the device identification is updated and bound as the changed access password.

According to the above step 501 to step 504, it can be known that the third-party device binds the device identification of the accessed device with the access password generated by the accessed device.

In step 505, the access device acquires the device identification of the accessed device.

When acquiring the device identification of the accessed device, the access device may receive a broadcast message which carries the device identification of the accessed device and is sent by the accessed device by a way of broadcast, and acquire the device identification of the accessed device from the broadcast message; or may acquire the device identification of the accessed device by scanning a graphic code of the accessed device.

It should be noted that, the present embodiment does not limit the specific way in which the access device acquires the device identification of the accessed device.

In step 506, the access device sends the device identification and the user account of the access device to the third-party device.

The user account herein is registered by the user on the third-party device, and the user may log in the user account on different access devices.

The access device sends the device identification and the user account logged in by the access device to the third-party device after acquiring the device identification of the accessed device.

In step 507, the third-party receives the device identification and the user account of the access device sent by the access device.

In step 508, the third-party binds the received user account of the access device with the device identification when detecting that the received device identification is not bound with the user account.

The third-party device detects whether the device identification is bound with the user account after receiving the device identification and the user account of the access device sent by the access device.

The third-party device binds the received user account of the access device with the device identification when detecting that the device identification is not bound with the user account. Alternatively, a binding request which is used to inquire of the access device about whether the device identification of the accessed device are bound with the user account of the access device, may be sent to the access device.

Figure 5B:
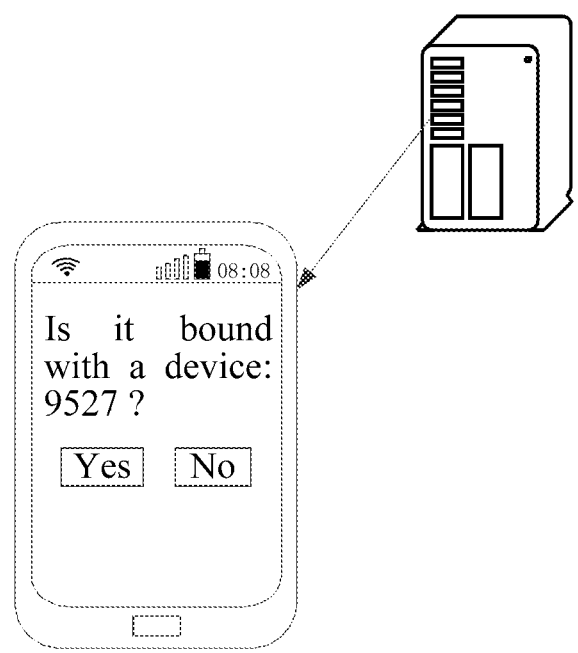
FIG. 5B is a diagram showing a third-party device sends a binding request to an access device according to an exemplary embodiment.

For example, referring to FIG. 5B, it is a diagram showing an interface that a third-party device sends a binding request to an access device according to an exemplary embodiment. As shown in FIG. 5B, the access device displays a request of "whether it is bound with a device 9527" on a screen after receiving the binding request sent by the third-party device, the user may agree to bind with the device 9527 by clicking a option of "Yes", and may also abandon binding with the device 9527 by clicking a option of "No".

If the access device agrees to bind with the accessed device, the third-party device binds the user account of the access device with the device identification of the accessed device, white the user account of the access device obtains the owner permission of the accessed device.

In order to distinguish other ordinary access devices (that is, the access device having no owner permission of the accessed device), the access device having the owner permission of the accessed device is determined as a login terminal. However, it should be noted that, the login terminal is an access device having the owner permission of the accessed device, and the name of the login terminal does not be used to limit the protection scope of the present invention. In a practical application, the login terminal may also have other names.

In step 509, the third-party device sends the access password corresponding to the device identification to the access device.

That is, the third-party device may directly send the access password corresponding to the device identification to the access device, so that the access device may directly access the accessed device according to the access password after binding the user account of the access device (i.e., the login terminal) with the device identification of the accessed device.

In step 510, the access device receives the access password.

Alternatively, the access device (i.e., the login terminal) may receive the access password by a way of a wireless network or a message and the like.

It should be noted that, the present embodiment does not limit the specific way that the access device receives the access password.

In step 511, the access device sends the access password to the accessed device.

The access device accesses the accessed device according to the access password after receiving the access password.

In a use scene, the access device (i.e., the login terminal) accesses the accessed device according to the access password, and may directly send the access password acquired by the wireless network to the accessed device. In the scene, the access device may not display the received access password, so as to enhance the security of the access password of the accessed device.

Alternatively, when the access device sends the access password to the accessed device, the access device displays the received access password to the user, and pop up a password input box. The user inputs the received access password into the password input box, and the access device sends the password to the accessed device after receiving the password input by the user.

In step 512, the accessed device receives the access password.

In step 513, the accessed device detects whether the received access password is the same as an access password generated by the accessed device.

Since the accessed device may change the access password, it is required to detect whether the received access password is the same as an access password generated by the accessed device.

In step 514, the accessed device allows the access device to access the accessed device if detecting that the access password is the same as an access password generated by the accessed device.

It should be noted that, when the access device (i.e., the login terminal) accesses the accessed device again, the third-party device directly sends the access password of the accessed device to the access device, the access device receives the access password and accesses the accessed device according to the access password after detecting that there is a binding relationship between the user account of the access device and the device identification of the accessed device.

Accordingly, the method for authenticating access provided in the embodiments of the present disclosure, by detecting that the device identification does not be bound, the third-party device binds the received user account with the device identification and determines that the user account has the owner permission to the accessed device. Since the owner permission are determined by binding the user account with the device identification of the accessed device, the access device accesses the accessed device only after being allowed by the login terminal, whereby it may solve the problem of the relatively poor security that an illegal user may easily acquire the access password and use the access password to access the Wi-Fi smart device since the user needs manually enter the access password on the mobile phone App, thus improving the security of the accessed device.

After the user account of a first access device which accesses the accessed device obtains the owner permission of the accessed device, if an ordinary access device accesses the accessed device, the ordinary access device need to be allowed by the access device corresponding to the user account having the owner permission, in order to access the accessed device. The specific implementation procedures refer to FIG. 6A.

Figure 6A:
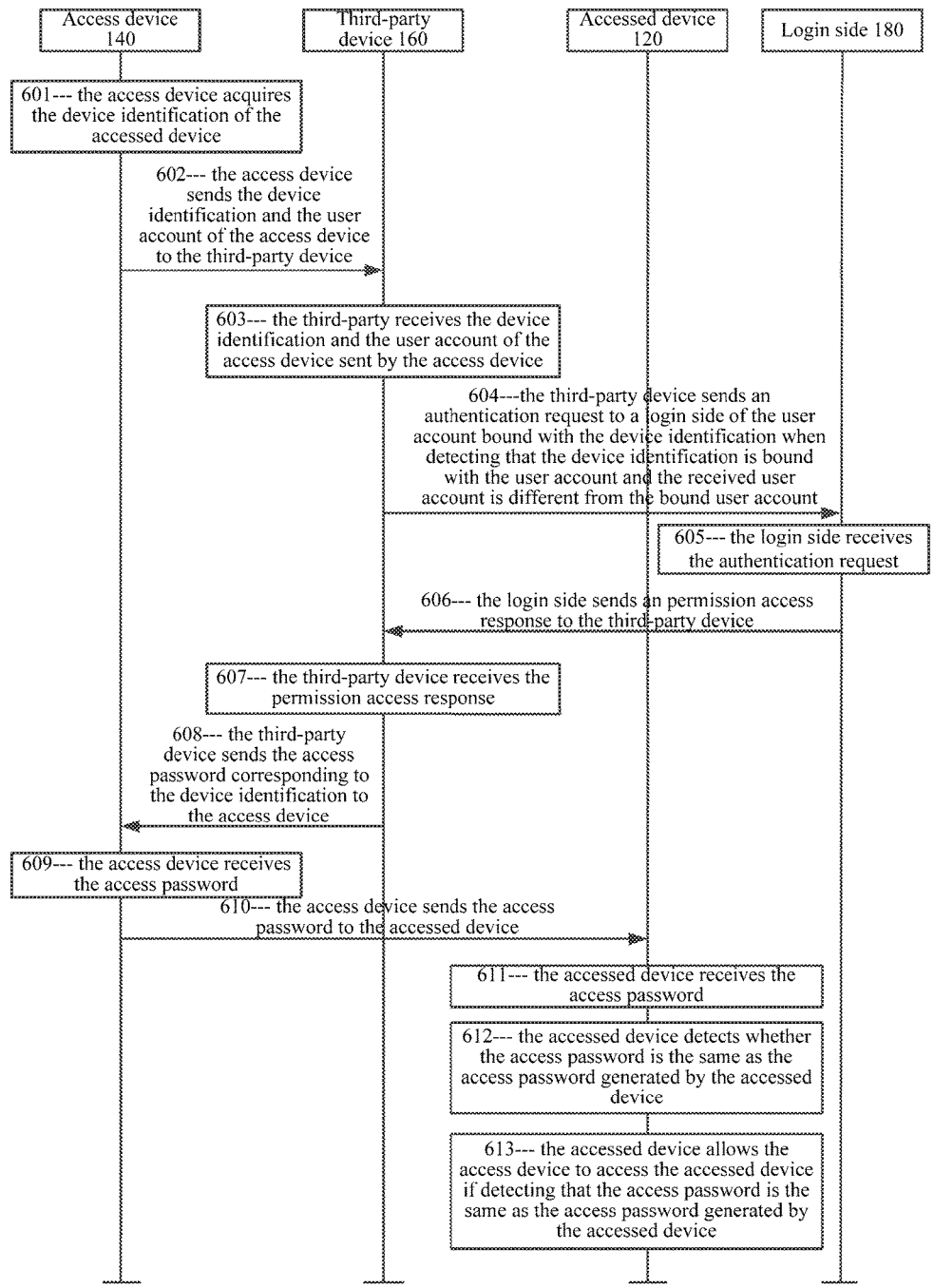
FIG. 6A is a flow chart showing a method for authenticating access according to a further exemplary embodiment.

FIG. 6A is a flow chart showing a method for authenticating access according to a further exemplary embodiment. As shown in FIG. 6, the method for authenticating access is applied in the implement environment as shown in FIG. 1, and includes the following steps.

In step 601, the access device acquires the device identification of the accessed device.

The access device may receive a broadcast message carrying the device identification of the accessed device sent by the accessed device by a way of broadcast, and acquire the device identification of the accessed device from the broadcast message; or may acquire the device identification of the accessed device by scanning a graphic code of the accessed device when acquiring the device identification of the accessed device.

Figure 6B:
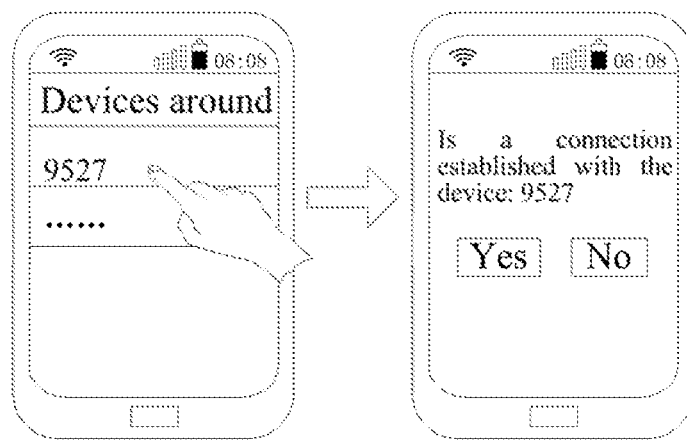
FIG. 6B is a diagram showing a device identification of an accessed device is acquired through a local area network LAN broadcast according to an exemplary embodiment.

For example, referring to FIG. 6B, it shows a diagram that a device identification of an accessed device is acquired through a LAN (local area network) broadcast according to an exemplary embodiment. As shown in FIG. 6B, the access device displays the search results on the screen after searching neighboring accessed devices through the LAN broadcast. At this time, the user may connect a desired accessed device by clicking the device identification of the accessed device, and after the user clicks the device identification 9527, the access device pops up an inquiry of "whether a connection is established with the device 9527".

Figure 6C:
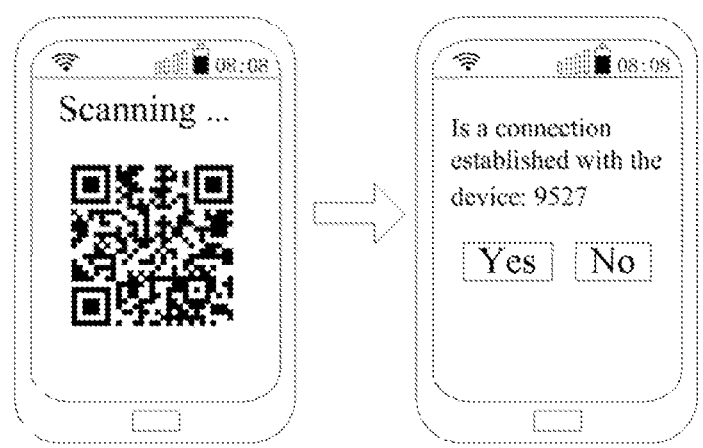
FIG. 6C is a diagram showing a device identification of an accessed device is acquired by scanning a graphic code of the accessed device according to an exemplary embodiment.

For example, referring to FIG. 6C it shows a diagram that a device identification of an accessed device is acquired by scanning a graphic code of the accessed device according to an exemplary embodiment. As shown in FIG. 6C, the access device directly pops up the inquiry of "whether a connection is established with the device 9527" after scanning a two-dimension code on the accessed device.

It should be noted that, the present embodiment does not limit to the specific way of acquiring the device identification of the accessed device.

In step 602, the access device sends the device identification and the user account of the access device to the third-party device.

The user account herein is registered by the user on the third-party device, and the user may log-in to different access devices by using the user account.

The access device sends the device identification and the user account logged in by the access device to the third-party device after acquiring the device identification of the accessed device.

For example, still referring to FIG. 6B and FIG. 6C, after the access device pops up the inquiry of "Is a connection established with the device: 9527", the user may abandon establishing the connection with the device: 9527 by clicking the option "no", or may click the option "Yes" to determine to establish the connection with the device: 9527. At this time, the access device sends the device identification: 9527 of the accessed device and the user account logged in by the access device to the third-party device.

In step 603, the third-party receives the device identification and the user account of the access device sent by the access device.

In step 604, the third-party device sends an authentication request to a login terminal of the user account bound with the device identification when detecting that the device identification is bound with the user account and the received user account is different from the bound user account.

The third-party device detects whether the device identification is bound with the user account after receiving the device identification and the user account of the access device sent by the access device. The third-party device detects whether the user account of the access device is the same as the user account bound with the device identification when detecting that the device identification is bound with the user account. And, the third-party device sends the authentication request to the login terminal of the user account bound with the device identification when detecting that the user account of the access device is different from the user account bound with the device identification.

That is, when the third-party device detects that the device identification is bound with the user account and the received user account is different from the bound user account, it is indicated that the access device sent the user account does not have the owner permissions of the accessed device, that is, the access device is an ordinary access device, the owner of the accessed device needs to be authenticated at this time, that is, the login terminal of the accessed device is authenticated.

The login terminal herein refers to such a terminal which has the owner permissions of the accessed device when there is a binding relationship between the user account logged in on the login terminal and the device identification.

The authentication request herein is used to request for allowing the access device to access the accessed device. For example, the authentication request may carry the user account sent on the access device.

And, when the third-party detects that the device identification is bound with the user account and the received user account is the same as the bound user account, it is indicated that the access device has the owner permissions of the accessed device, and at this time, the third-party may directly send the access password corresponding to the device identification to the access device.

In step 605, the login terminal receives the authentication request.

The login terminal may prompt the user of the login terminal according to the authentication request, for example, may display the authentication request on the screen of the login terminal after receiving the authentication request sent by the third-party device.

Figure 6D:
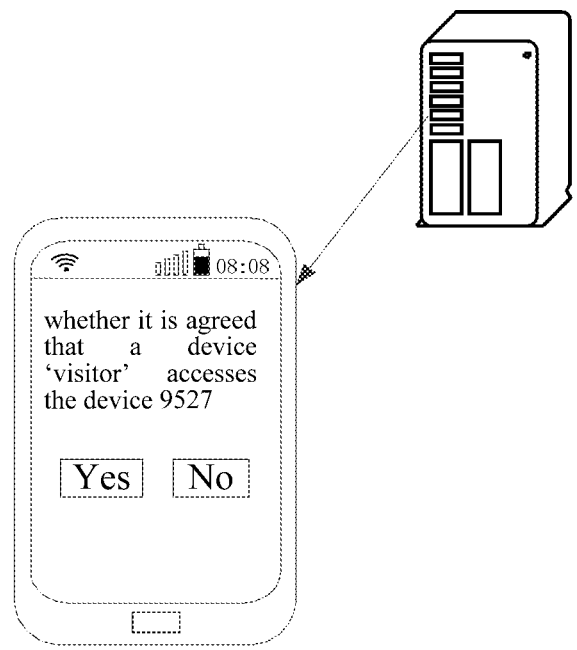
FIG. 6D is a diagram showing a third-party device sends an authentication request to a login terminal according to an exemplary embodiment.

For example, referring to FIG. 6D, it is a diagram showing a third-party device sends an authentication request to a login terminal according to an exemplary embodiment. As shown in FIG. 6D, the login terminal displays an inquiry of "Is it agreed that a device: visitor accesses the device: 9527" on the screen after receiving the authentication request sent by the third-party device.

In step 606, the login terminal sends a permission access response to the third-party device.

The permission access response herein is used to instruct to allow the access device to access the accessed device.

In a use scene, if the user of the login terminal allows the access device to access the accessed device, the user of the login terminal sends the permission access response to the third-party device.

For example, still referring to FIG. 6D, when the user of the login terminal allows the access device 'visitor' to access the accessed device: 9527, the user may click the option "Yes", and at this time, the login terminal sends the permission access response to the third-party device. Instead, when the user of the login terminal prohibits the access device; visitor to access the accessed device: 9527, the user may click the option "No", and al this time, the login terminal sends a prohibitive access response to the third-party device.

Alternatively, the third-party may send error codes to the access device 'visitor' after receiving the prohibitive access response, so as to indicate that the access device 'visitor' can't access the accessed device.

In step 607, the third-party device receives the permission access response.

In step 608, the third-party device sends the access password corresponding to the device identification to the access device.

In step 609, the access device receives the access password.

Alternatively, the access device may receive the access password by a way of a wireless network or a message and the like.

It should be noted that, the present embodiment does not limit the specific way that the access device receives the access password.

In step 610, the access device sends the access password to the accessed device.

The access device accesses the accessed device according to the access password after receiving the access password.

In a use scene, the access device (i.e., the login terminal) accesses the accessed device according to the access password, and may send the access password to the accessed device. In this case, the access device may directly send the access password acquired through the wireless network to the accessed device. In the scene, the access device may not display the received access password, so as to enhance the security of the access password of the accessed device.

Alternatively, when the access device sends the access password to the accessed device, the access device displays the received access password to the user, and pop up a password input box. The user inputs the received access password to the password input box, and the access device sends the password to the accessed device after receiving the password input by the user.

In step 611, the accessed device receives the access password.

In step 612, the accessed device detects whether the received access password is the same as the access password generated by the accessed device.

Since the accessed device may change the access password, it is required to detect whether the received access password is the same as the access password generated by the accessed device. For example, if the accessed device no longer allows the access device which has assessed to continue to access, the accessed device may also change the original access password in addition to prohibit the access device to access at the login terminal. In this case, if the access device uses the known original access password before accessing the accessed device again, the accessed device may match the received original access password and the updated existing access password, and when the matching is not successful, the access device is prohibited to access, whereby a new permission required when the accessed device is accessed may be ensured.

In step 613, the accessed device allows the access device to access the accessed device if detecting that the access password is the same as the access password generated by the accessed device.

Alternatively, the accessed device prohibits the access device to access the accessed device if detecting that the access password is different from the access password generated by the accessed device, and at this time, the accessed device may send error codes to the access device, so as to indicate that the access device may not access the accessed device.

It should be noted that, an access permission by which the access device accesses the accessed device may be retained only for a short time, and the accessed device may cancel the access permission of the access device by changing the access password.

Accordingly, the method for authenticating access provided in the embodiments of the present disclosure acquires the device identification of the accessed device by using the access device, sends the device identification and a user account of the access device to a third-party device, receives an access password sent by the third-party device, and accesses the accessed device according to the access password after the third-party device inquires of a login terminal and determines to allow the access device to access the accessed device, whereby it may solve the problem of the relatively poor security that an illegal user may easily acquire the access password and use the access password to access the Wi-Fi smart device since the user needs manually enter the access password on the mobile phone App, thus improving the security of the accessed device.

The method for authenticating access provided in the embodiments of the present disclosure receives the access password sent by the access device and allows the access device to access the accessed device after detecting that the received access password is the same as the access password generated by the accessed device. Since the access device is allowed to access only when the accessed device verifies that the received the access password is the same as the generated access password, it may solve the problem of the relatively poor security that the access device may still access the accessed device if the access password does not be verified in case that the access password is changed, thus improving the security of the accessed device.

The method for authenticating access provided in the embodiments of the present disclosure receives the device identification and the user account of the access device sent by the access device, sends the authentication request to the login terminal after detecting that the device identification is bound, and sends an access password corresponding to the device identification to the access device after receiving the permission access response fed back by the login terminal. Since the third-party may send the access password to the access device after allowed by the login terminal, it may solve the problem of the relatively poor security that an illegal user may easily acquire the access password, and use the access password to access the Wi-Fi smart device, thus improving the security of the accessed device.

The following is the apparatus embodiments of the present disclosure, which may be used to perform the method embodiments of the present disclosure. For the details that are not disclosed in the apparatus embodiments of the present disclosure, refer to the method embodiments of the present disclosure.

Figure 7:
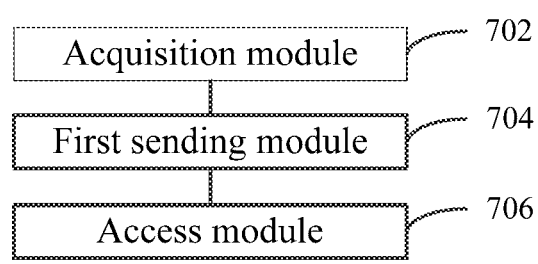
FIG. 7 is a block diagram showing an apparatus for authenticating access according to an exemplary embodiment.

FIG. 7 is a block diagram showing an apparatus for authenticating access according to an exemplary embodiment. As shown in FIG. 7, the apparatus for authenticating access is applied in the access device 140 in the implement environment shown in FIG. 1. The apparatus for authenticating access includes but is not limited to: an acquisition module 702, a first sending module 704 and an access module 706.

The acquisition module 702 is configured to acquire a device identification of an accessed device.

The first sending module 704 is configured to send the device identification and a user account of the access device to a third-party device.

The access module 706 is configured to receive an access password, and access the accessed device according to the access password, which is an access password corresponding to the device identification sent by the third-party device to the access device, in case that the device identification has been bound with a use account and the user account of the access device is different from the user account bound with the device identification, after the third-party device receives a permission access response fed back by a login terminal according to an authentication request, wherein the authentication request is sent by the third-party device to the login terminal of the user account bound with the device identification after the third-party device receives the device identification and the user account of the access device sent by the access device, the authentication request is used to request for allowing the access device to access the accessed device, and the permission access response is used to instruct to allow the access device to access the accessed device.

Accordingly, the apparatus for authenticating access provided in the embodiments of the present disclosure acquires a device identification of the accessed device by using the access device, sends the device identification and a user account of the access device to a third-party device, receives an access password sent by the third-party device, and accesses the accessed device according to the access password after the third-party device inquires of a login terminal and determines to allow the access device to access the accessed device. Therefore, it may solve the problem of the relatively poor security that an illegal user easily acquires the access password and use the access password to access the Wi-Fi smart device since the user needs manually input the access password in the mobile phone App, thus improving the security of the accessed device.

Figure 8:
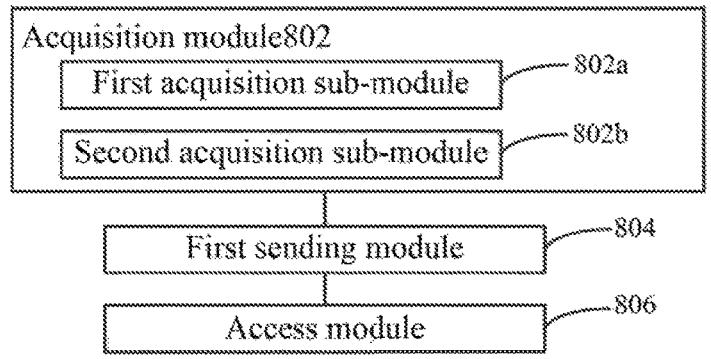
FIG. 8 is a block diagram showing an apparatus for authenticating access according to another exemplary embodiment.

FIG. 8 is a block diagram showing an apparatus for authenticating access according to another exemplary embodiment. As shown in FIG. 8, the apparatus for authenticating access is applied in the access device 140 in the implement environment shown in FIG. 1. The apparatus for authenticating access includes but is not limited to: an acquisition module 802, a first sending module 804 and an access module 806.

The acquisition module 802 is configured to acquire a device identification of an accessed device.

The first sending module 804 is configured to send the device identification and a user account of the access device to a third-party device.

The access module 806 is configured to receive an access password, and access the accessed device according to the access password, which is an access password corresponding to the device identification sent by the third-party device to the access device, in case that the device identification has been bound with a use account and the user account of the access device is different from the user account bound with the device identification, after the third-party device receives a permission access response fed back by a login terminal according to an authentication request, wherein the authentication request is sent by the third-party device to the login terminal of the user account bound with the device identification after the third-party device receives the device identification and the user account of the access device sent by the access device, the authentication request is used to request for allowing the access device to access the accessed device, and the permission access response is used to instruct to allow the access device to access the accessed device.

In a possible embodiment, the acquisition module 802 may include: a first acquisition sub-module 802a or a second acquisition sub-module 802b.

The first acquisition sub-module 802a is configured to receive a broadcast message carrying the device identification of the accessed device sent by the accessed device by a way of broadcast, and acquire the device identification of the accessed device from the broadcast message. Or, The second acquisition sub-module 802b is configured to acquire the device identification of the accessed device by scanning a graphic code of the accessed device.

Accordingly, the apparatus for authenticating access provided in the embodiments of the present disclosure acquires a device identification of the accessed device by using the access device, sends the device identification and a user account of the access device to a third-party device, receives an access password sent by the third-party device, and accesses the accessed device according to the access password after the third-party device inquires of a login terminal and determines to allow the access device to access the accessed device. Therefore, it may solve the problem of the relatively poor security that an illegal user easily acquires the access password and use the access password to access the Wi-Fi smart device since the user needs manually input the access password in the mobile phone App, thus improving the security of the accessed device.

Figure 9:
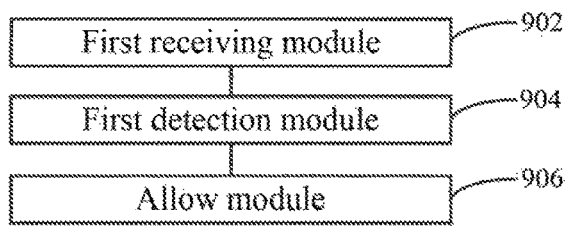
FIG. 9 is a block diagram showing an apparatus for authenticating access according to a further exemplary embodiment.

FIG. 9 is a block diagram showing an apparatus for authenticating access according to a further exemplary embodiment. As shown in FIG. 9, the apparatus for authenticating access is applied in the accessed device 120 in the implement environment shown in FIG. 1. The apparatus for authenticating access includes but is not limited to: a first receiving module 902, a first detection module 904 and an allow module 906.

The first receiving module 902 is configured to receive an access password send from the access device, wherein the access password is an access password corresponding to the device identification sent by the third-party device to the access device, in case that the device identification has been bound with a use account and the user account of the access device is different from the user account bound with the device identification, after the third-party device receives a permission access response fed back by a login terminal according to an authentication request, wherein the authentication request is sent by the third-party device to the login terminal of the user account bound with the device identification after the third-party device receives the device identification and the user account of the access device sent by the access device. The authentication request is used to request for allowing the access device to access the accessed device, and the permission access response is used to instruct to allow the access device to access the accessed device.

The first detection module 904 is configured to detect whether the access password is the same us the access password generated by the accessed device.

The allow module 906 is configured to allow the access device to access the accessed device when the first detection module detects that the access password is the same as the access password generated by the accessed device.

Accordingly, the apparatus for authenticating access provided in the embodiment of the present disclosure receives the access password sent by the access device and allows the access device to access the accessed device after detecting that the received access password is the same as the access password generated by the accessed device. Since the access device is allowed to access only when the accessed device verifies that the received the access password is the same as the generated access password, it may solve the problem of the relatively poor security that the access device may still access the accessed device if the access password does not be verified in case that the access password is changed, thus improving the security of the accessed device.

Figure 10:
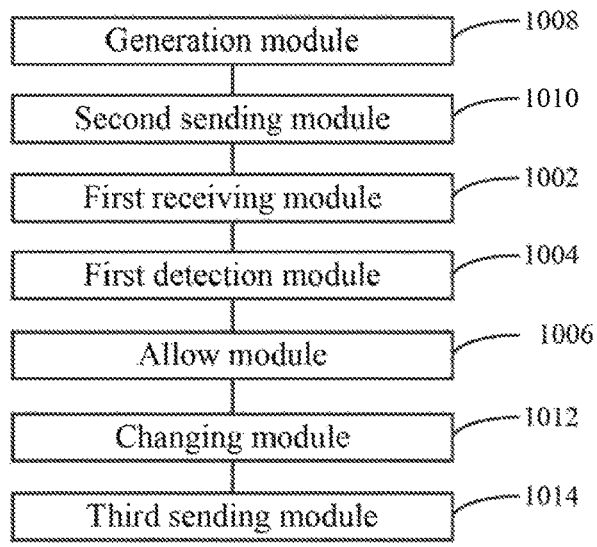
FIG. 10 is a block diagram showing an apparatus for authenticating access according to a further exemplary embodiment.

FIG. 10 is a block diagram showing an apparatus for authenticating access according to a further exemplary embodiment. As shown in FIG. 10, the apparatus for authenticating access is applied in the accessed device 120 in the implement environment shown in FIG. 1. The apparatus for authenticating access includes but is not limited to a first receiving module 1002, a first detection module 1004 and an allow module 1006.

The first receiving module 1002 is configured to receiving an access password send from the access device, wherein the access password is an access password corresponding to the device identification sent by the third-party device to the access device, in case that the device identification has been bound with a use account and the user account of the access device is different from the user account bound with the device identification, after the third-party device receives a permission access response fed back by a login terminal according to an authentication request, wherein the authentication request is sent by the third-party device to the login terminal of the user account bound with the device identification after the third-party device receives the device identification and the user account of the access device sent by the access device, the authentication request is used to request for allowing the access device to access the accessed device, and the permission access response is used to instruct to allow the access device to access the accessed device.

The first detection module 1004 is configured to detect whether the access password is the same as the access password generated by the accessed device.

The allow module 1006 is configured to allow the access device to access the accessed device when the first detection module detects that the access password is the same as the access password generated by the accessed device.

In a possible embodiment, the apparatus further includes a generation module 1008 and a second sending module 1010.

The generation module 1008 is configured to generate the access password.

The second sending module 1010 is configured to send the access password and the device identification of the accessed device to the third-patty device, so that the third-party device binds the access password with the device identification and saves.

In a possible embodiment, the apparatus further includes a changing module 1012 and a third sending module 1014.

The changing module 1012 is configured to periodically change the access password, and obtain a changed access password.

The third sending module 1014 is configured to send the changed access password and the device identification of the accessed device to the third-party device, the third-party device updates and binds a pre-stored access password bound with the device identification as the changed access password.

Accordingly, the apparatus for authenticating access provided in the embodiments of the present disclosure receives the access password sent by the access device and allows the access device to access the accessed device after detecting that the received access password is the same as the access password generated by the accessed device. Since the access device is allowed to access only when the accessed device verifies that the received the access password is the same as the generated access password, it may solve the problem of the relatively poor security that the access device may still access the accessed device if the access password does not be verified in case that the access password is changed, thus improving the security of the accessed device.

Figure 11:
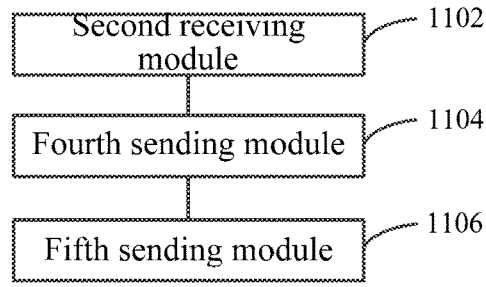
FIG. 11 is a block diagram showing an apparatus for authenticating access according to a further exemplary embodiment.

FIG. 11 is a block diagram showing an apparatus for authenticating access according to a further exemplary embodiment. As shown in FIG. 11, the apparatus for authenticating access is applied in the third-party device 160 in the implement environment shown in FIG. 1. The apparatus for authenticating access includes but is not limited to: a second receiving module 1102, a fourth sending module 1104 and a fifth sending module 1106.

The second receiving module 1102 is configured to receive a device identification of an accessed device and a user account of an access device sent by the access device.

The fourth sending module 1104 is configured to send an authentication request to a login terminal of the user account bound with the device identification when detecting that the device identification has been bound with a user account and the user account of the access device is different from the user account bound with the device identification, wherein the authentication request is used to request for allowing the access device to access the accessed device.

The fifth sending module 1106 is configured to send an access password corresponding to the device identification to the access device after a permission access response fed back by the login terminal according to the authentication request is received, so that the access device accesses the accessed device according to the access password, wherein the permission access response is used to instruct to allow the access device to access the accessed device.

Accordingly, the method for authenticating access provided in the embodiments of the present disclosure receives the device identification and the user account of the access device sent by the access device, sends the authentication request to the login terminal after detecting that the device identification is bound, and sends an access password corresponding to the device identification to the access device after receiving the permission access response fed back by the login terminal. Since the third-party may send the access password to the access device after allowed by the login terminal, it may solve the problem of the relatively poor security that an illegal user may easily acquire the access password, and use the access password to access the Wi-Fi smart device, thus improving the security of the accessed device.

Figure 12:
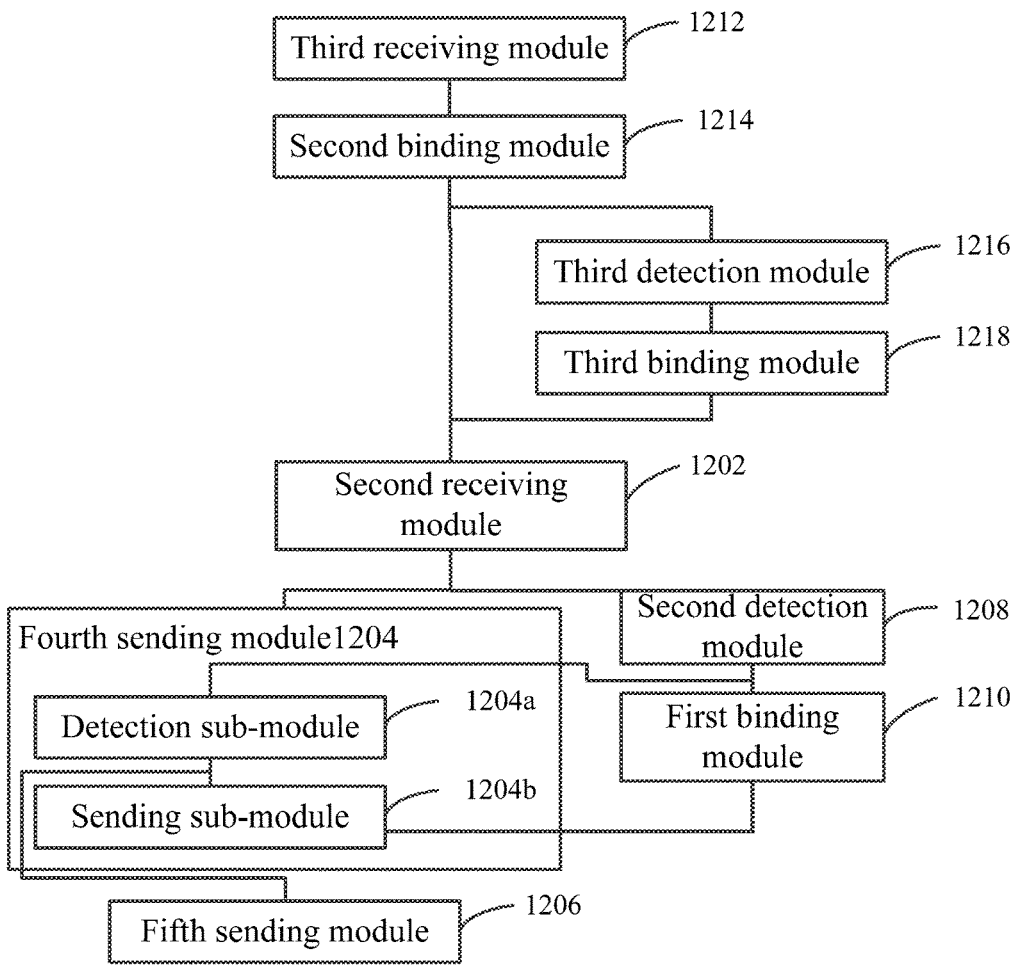
FIG. 12 is a block diagram showing an apparatus (or authenticating access according to a further exemplary embodiment.

FIG. 12 is a block diagram showing an apparatus for authenticating access according to a further exemplary embodiment. As shown in FIG. 12, the apparatus for authenticating access is applied in the third-party device 160 in the implement environment shown in FIG. 1. The apparatus for authenticating access includes but is not limited to: a second receiving module 1202, a fourth sending module 1204 and a fifth sending module 1206.

The second receiving module 1202 is configured to receive a device identification of an accessed device and a user account of an access device sent by the access device.

The fourth sending module 1204 is configured to send an authentication request to a login terminal of the user account bound with the device identification when detecting that the device identification has been bound with a user account and the user account of the access device is different from the user account bound with the device identification, wherein the authentication request is used to request for allowing the access device to access the accessed device.

The fifth sending module 1206 is configured to send an access password corresponding to the device identification to the access device after a permission access response fed back by the login terminal according to the authentication request is received, so that the access device accesses the accessed device according to the access password, wherein the permission access response is used to instruct to allow the access device to access the accessed device.

In a possible embodiment, the apparatus further include: a second detection module 1208 and a first binding module 1210.

The second detection module 1208 is configured to detect whether the device identification is bound with the user account.

The first binding module 1210 is configured to bind the device identification with the user account of the access device, and determine the access device as the login terminal when the second detection module 1208 detects that the device identification is not bound with the user account.

In a possible embodiment, the fourth sending module 1204 further include: a detection sub-module 1204a and a sending sub-module 1204b.

The detection sub-module 1204a is configured to detect whether the user account of the access device is the same as the user account bound with the device identification when the second detection module 1208 detects that the device identification is bound with the user account.

The sending sub-module 1204b is configured to send the authentication request to the login terminal of the user account bound with the device identification when the detection sub-module 1204a detects that the user account of the access device is different from the user account bound with the device identification.

In a possible embodiment, the fifth sending module 1206 is further configured to send the access password corresponding to the device identification to the access device when the detection sub-module 1204a detects that the user account of the access device is the same as the user account bound with the device identification.

In a possible embodiment, the apparatus further include: a third receiving module 1212 and a second binding module 1214.

The third receiving module 1212 is configured to receive the access password and the device identification of the accessed device sent by the accessed device.

The second binding module 1214 is configured to bind and save the access password and the device identification of the accessed device when there is not the bound access password with the device identification of the accessed device.

In a possible embodiment, the apparatus further include a third detection module 1216 and a third binding module 1218.

The third detection module 1216 is configured to detect whether the received access password is the same as the bound access password when there exists the bound access password with the device identification of the accessed device.

The third binding module 1218 is configured to update and bind the access password bound with the device identification as the received access password when the received access password is different from the bound access password.

Accordingly, the apparatus for authenticating access provided in the embodiments of the present disclosure receives the access password sent by the access device and allows the access device to access the accessed device after detecting that the received access password is the same as the access password generated by the accessed device. Since the access device is allowed to access only when the accessed device verifies that the received the access password is the same as the generated access password, it may solve the problem of the relatively poor security that the access device may still access the accessed device if the access password does not be verified in case that the access password is changed, thus improving the security of the accessed device.

With regard to the apparatus in the above embodiment, detailed description of specific manner for performing operation of modules has been made in the embodiment related to the method, and no detailed illustration will be made herein.

Figure 13:
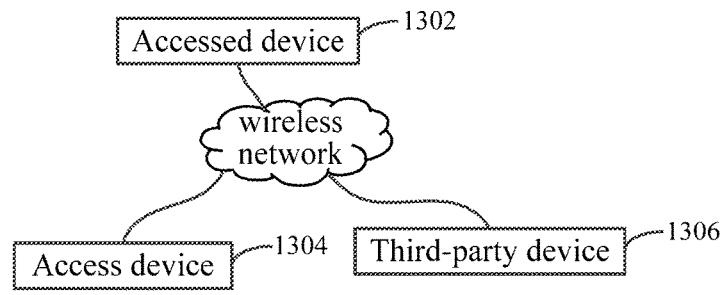
FIG. 13 is a block diagram showing a system for authenticating access according to an exemplary embodiment.

FIG. 13 is a block diagram showing a system for authenticating access according to an exemplary embodiment. As shown in FIG. 13, the system for authenticating access is applied in the implement environment shown in FIG. 1. The system for authenticating access includes but is not limited to: an accessed device 1302, an access device 1304 and a third-party device 1306.

The accessed device 1302 includes the apparatus for authenticating access described in FIG. 9 or FIG. 10.

The access device 1304 includes the apparatus for authenticating access described in FIG. 7 or FIG. 8.

The third-party device 1306 includes the apparatus for authenticating access described in FIG. 11 or FIG. 12.

Accordingly, the system for authenticating access provided in the embodiments of the present disclosure acquires a device identification of the accessed device by using the access device, sends the device identification and a user account of the access device to a third-party device, receives an access password sent by the third-party device, and accesses the accessed device according to the access password after the third-party device inquires of a login terminal and determines to allow the access device to access the accessed device. Therefore, it may solve the problem of the relatively poor security that an illegal user easily acquires the access password and use the access password to access the Wi-Fi smart device since the user needs manually input the access password in the mobile phone App, thus improving the security of the accessed device.

The system for authenticating access provided in the embodiments of the present disclosure receives the access password sent by the access device and allows the access device to access the accessed device after detecting that the received access password is the same as the access password generated by the accessed device. Since the access device is allowed to access only when the accessed device verifies dial the received the access password is the same as the generated access password, it may solve the problem of the relatively poor security that the access device may still access the accessed device if the access password does not be verified in case that the access password is changed, thus improving the security of the accessed device.

Accordingly, the system for authenticating access provided in the embodiments of the present disclosure receives the device identification and the user account of the access device sent by the access device, sends the authentication request to the login terminal after detecting that the device identification is bound, and sends an access password corresponding to the device identification to the access device after receiving the permission access response fed back by the login terminal. Since the third-party may send the access password to the access device after allowed by the login terminal, it may solve the problem of the relatively poor security that an illegal user may easily acquire the access password, and use the access password to access the Wi-Fi smart device, thus improving the security of the accessed device.

With regard to the system in the above embodiment, detailed description of specific manner for conducting operation has been made in the embodiment related to the method, and no detailed illustration will be made herein.

An exemplary embodiment of the present disclosure provides an apparatus for authenticating access, applied in an access device, which may realize a method for authenticating access provided by the present disclosure. The apparatus for authenticating access includes: a processor, and a memory for storing instructions executable by the processor;

wherein the processor is configured to perform:

acquiring a device identification of an accessed device:

sending the device identification and a user account of the access device to a third-party device; and receiving an access password, and accessing the accessed device according to the access password, which is an access password corresponding to the device identification sent by the third-party device to the access device, in case that the device identification has been bound with a use account and the user account of the access device is different from the user account bound with the device identification, after the third-pony device receives a permission access response fed back by a login terminal according to an authentication request, wherein the authentication request is sent by the third-party device to the login terminal of the user account bound with the device identification after the third-party device receives the device identification and the user account of the access device sent by the access device, the authentication request is used to request for allowing the access device to access the accessed device, and the permission access response is used to instruct to allow the access device to access the accessed device.

An exemplary embodiment of the present disclosure provides an apparatus for authenticating access, applied in an accessed device, which may realize a method for authenticating access provided by the present disclosure. The apparatus for authenticating access includes; a processor, and a memory for storing instructions executable by the processor;

wherein the processor is configured to:

receiving an access password send from the access device, wherein the access password is an access password corresponding to the device identification sent from a third-party device to the access device after the third-party device receives a permission access response fed back by a login terminal according to an authentication request, wherein the authentication request is sent by the third-party device to the login terminal of the user account bound with the device identification when the user account of the access device and a user account bound with the device identification, if the device identification has been bound with the use account, are different after the third-party device receives the device identification and the user account of the access device sent by the access device, the authentication request is used to request for allowing the access device to access the accessed device, and the permission access response is used to instruct to allow the access device to access the accessed device;

detect whether the access password is the same as the access password generated by the accessed device; and allow the access device to access the accessed device when detecting that the access password is the same as the access password generated by the accessed device.

An exemplary embodiment of the present disclosure provides an apparatus for authenticating access, applied in a third-party device, which may realize a method for authenticating access provided by the present disclosure. The apparatus for authenticating access includes: a processor: and a memory for storing instructions executable by the processor;

wherein the processor is configured to;

receive a device identification of an accessed device and a user account of an access device sent by the access device;

send an authentication request to a login terminal of the user account bound with the device identification when detecting that the device identification has been bound with a user account and the user account of the access device is different from the user account bound with the device identification, wherein the authentication request is used to request for allowing the access device to access the accessed device; and send an access password corresponding to the device identification to the access device after a permission access response fed back by the login terminal according to the authentication request is received, so that the access device accesses the accessed device according to the access password, wherein the permission access response is used to instruct to allow the access device to access the accessed device.

Figure 14:
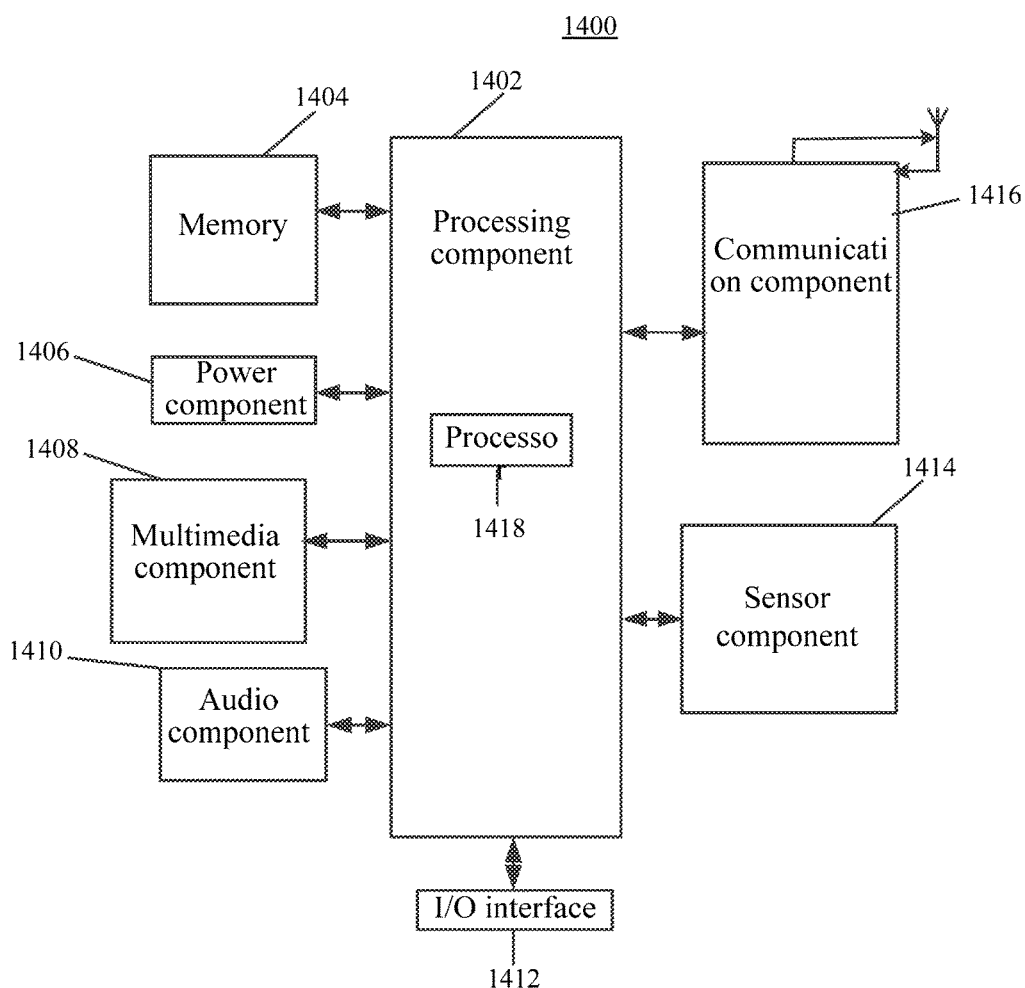
FIG. 14 is a block diagram showing an apparatus for accessing an accessed device according to an exemplary embodiment.

FIG. 14 is a block diagram showing an apparatus for accessing an accessed device according to an exemplary embodiment. For example, the device 1400 may be a mobile phone, a computer, a digital broadcast terminal, a messaging device, a gaming console, a tablet, a medical device, exercise equipment, a personal digital assistant (PDA), and the like.

Referring to FIG. 14, the device 1400 may include one or more of the following components: a processing component 1402, a memory 1404, a power component 1406, a multimedia component 1408, an audio component 1410, an input/output (I/O) interface 1412, a sensor component 1414, and a communication component 1416.

The processing component 1402 usually controls overall operations of the device 1400, such as the operations associated with display, telephone calls, data communications, camera operations, and recording operations. The processing component 1402 may include one or more processors 1418 to execute instructions to perform all or part of the steps in the above described methods. Moreover, the processing component 1402 may include one or more modules which facilitate the interaction between the processing component 1402 and other components. For instance, the processing component 1402 may include a multimedia module to facilitate the interaction between the multimedia component 1408 and the processing component 1402.

The memory 1404 is configured to store various types of data to support the operation of the device 1400. Examples of such data include instructions for any application or method operated on the device 1400, contact data, phonebook data, messages, pictures, videos, etc. The memory 1404 may be implemented using any type of volatile or non-volatile memory device or combination thereof such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 1406 provides power to various components of the device 1400. The power component 1406 may include a power management system, one or more power sources, and other components associated with the generation, management, and distribution of power in the device 1400.

The multimedia component 1408 includes a screen providing an output interface between the device 1400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1408 includes a from camera and or a rear camera. The front camera and/or the rear camera may receive an external multimedia datum while the device 1400 is in an operation manner, such as a photographing manner or a video manner. Each of the front camera and the rear camera may be a fixed optical lens system or have focus and optical zoom capability.

The audio component 1410 is configured to output and/or input audio signals. For example, the audio component 1410 includes a microphone (MIC) configured to receive an external audio signal when the device 1400 is in an operation manner, such as a call manner, a recording manner, and a voice identification manner. The received audio signal may be further stored in the memory 1404 or transmitted via the communication component 1416. In some embodiments, the audio component 1410 further includes a speaker to output audio signals.

The I/O interface 1412 provides an interlace between the processing component 1402 and peripheral interface modules, such as a keyboard, a click wheel, a button, and the like. The button may include, but not limited to, a home button, a volume button, a starting button, and a locking button.

The sensor component 1414 includes one or more sensors to provide status assessments of various aspects of the device 1400. For instance, the sensor component 1414 may detect an open/closed status of the device 1400, relative positioning of components, e.g., the display and the keyboard, of the device 1400, a change in position of the device 1400 or a component of the device 1400, a presence or absence of user contact with the device 1400, an orientation or an acceleration/deceleration of the device 1400, and a change in temperature of the device 1400. The sensor component 1414 may include a proximity sensor configured to detect the presence of nearby objects without any physical contact. The sensor component 1414 may also include a light sensor, such as a CMOS or CCD image sensor, for use in imaging applications. In some embodiments, the sensor component 1414 may also include an accelerometer sensor, a gyroscope sensor, a magnetic sensor, a pressure sensor, or a temperature sensor.

The communication component 1410 is configured to facilitate communication, wired or wirelessly, between the device 1400 and other devices. The device 1400 may access a wireless network based on a communication standard, such as WI-FI, 2G, or 3G, or a combination thereof. In one exemplary embodiment, the communication component 1416 receives a broadcast signal or broadcast associated information from an external broadcast management system via a broadcast channel. In one exemplary embodiment, the communication component 1416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 1400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components for performing the method for authenticating access, which is taken the access device or the accessed device as an executive body.

In exemplary embodiments, there is also provided a non-transitory computer readable storage medium including instructions, such as included in the memory 1404, executable by the processor 1418 in the device 1400, for performing the above method. For example, the non-transitory computer-readable storage medium may be a ROM, a random access memory (RAM), a CD-ROM, a magnetic tape, a floppy disc, an optical data storage device, and the like.

Figure 15:
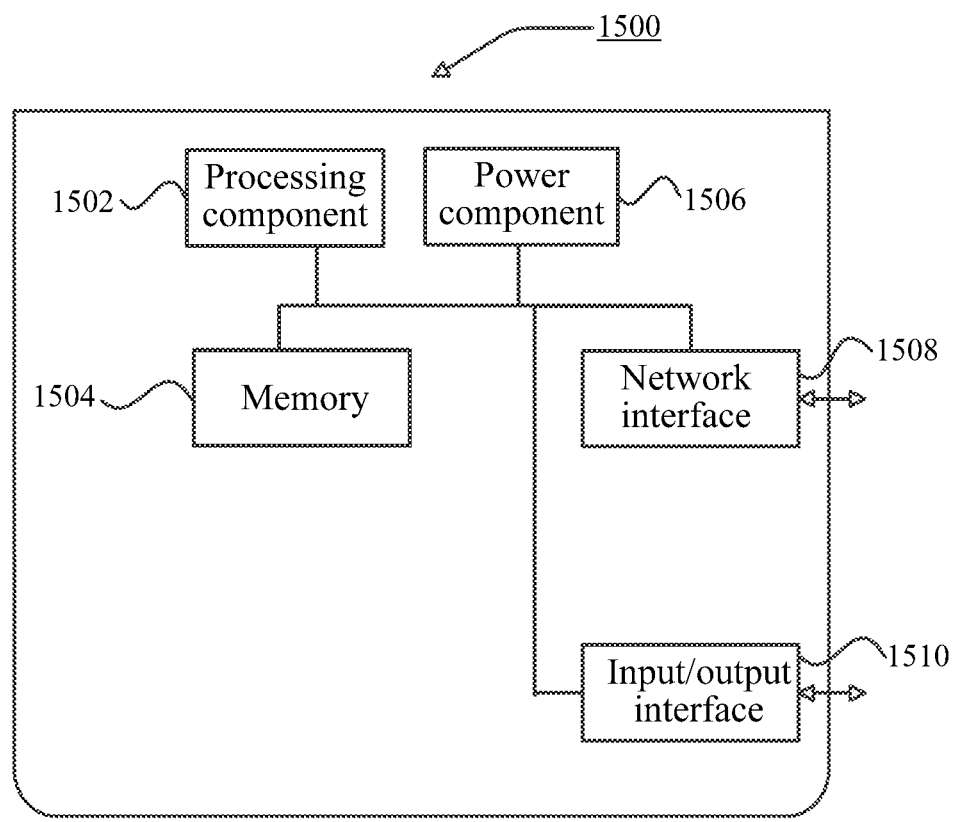
FIG. 15 is a block diagram showing an apparatus for verifying an access device according to an exemplary embodiment.

FIG. 15 is a block diagram showing an apparatus for verifying an access device according to an exemplary embodiment. For example, the apparatus 1500 may be provided as a server. As shown in FIG. 15, the apparatus 1500 includes a processing component 1522 that further includes one or more processors, and memory resources represented by a memory 1532 for storing instructions, such as application programs, executable by the processing component 1522. The application programs stored in memory 1532 may include one or more modules, each of which corresponds to a set of instructions. Moreover, the processing component 1522 is configured to execute instructions for performing the method for authenticating access, which is taken the third-party device as an executive body.

The apparatus 1500 may also include a power component 1526 configured to perform power management of the apparatus 1500, wired or wireless network interface(s) 1550 configured to connect the apparatus 1500 to a network, and an input/output (I/O) interface 1558. The apparatus 1500 may operate based on an operating system stored in the memory 1532, such as Windows Server™, Mac OS X™, Unix™, Linux™, FreeBSD™, or the like.

After considering this description and carrying out the embodiments disclosed herein, those skilled in the art may easily anticipate other implementation aspects of the present disclosure. The present disclosure is meant to cover any variations, use or adaptive change of these embodiments, and these variations, use or adaptive change follow general concept of the present disclosure and include the common knowledge or the customary technical means in the technical field that is not disclosed in the present disclosure. The description and embodiments are only exemplary, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

What is claimed is:

1. A method for authenticating access, which is applied in a first device, and comprises:
acquiring a device identification of a second device to be accessed by the first device with a first user account, the device identification of the second device being bound with a second user account,
sending the device identification and the first user account of the first device to a third-party device; and
receiving an access password from the third-party device, and accessing the second device according to the access password, wherein the third-party device receives the device identification and the first user account of the first device, sends an authentication request to a login terminal for the second user account bound with the device identification when the first user account is different from the second user account, receives a permission access response for an access authorization from the login terminal in response to the authentication request, and sends the access password associated with the device identification to the first device to authorize an access,
wherein the second device receives the access password sent from the first device, and detects whether the received access password which is a first access password is the same as a second access password generated by the second device, wherein the second access password is periodically changed by the second device to obtain an updated second access password, and the updated second access password and the device identification of the second device is sent to the third-party device, so that the third-party device stores the updated second access password associated with the device identification, and
wherein the first device, the second device, the third-party device, and the login terminal are physically remote from one another.

2. The method according to claim 1, wherein, the acquiring the device identification of the second device to be accessed by the first device with the first user account comprises:
receiving a broadcast message carrying the device identification of the second device sent from the second device by a way of broadcast, and acquiring the device identification of the second device from the broadcast message; or
acquiring the device identification of the second device by scanning a graphic code of the second device.

3. A method for authenticating access of a first device with a first user account to a second device having a second user account, comprising:
receiving, by the second device, an access password sent from the first device, wherein the access password is provided to the first device by a third-party device, the third-party device receives a device identification of the second device to be accessed and the first user account of the first device from the first device, sends an authentication request to a login terminal for the second user account bound with the device identification when the first user account is different from the second user account, receives a permission access response for an access authorization from the login terminal in response to the authentication request, and sends the access password associated with the device identification to the first device to authorize an access;
detecting whether the received access password which is a first access password is the same as a second access password generated by the second device, wherein the second access password is periodically changed by the second device to obtain an updated second access password, and the updated second access password and the device identification of the second device is sent to the third-party device, so that the third-party device stores the updated second access password associated with the device identification; and allowing the first device to access the second device when the first access password matches the second access password generated by the second device, wherein the first device, the second device, the third-party device, and the login terminal are physically remote from one another.

4. The method according to claim 3, wherein, the method further comprises:

generating the second access password; and sending the second access password and the device identification of the second device to the third-party device, so that the third-party device stores the second access password associated with the device identification.

5. A method for authenticating access by a first device with a first user account to a second device with a second user account, comprising:

receiving, by a third-party device, a device identification of the second device and the first user account of the first device sent from the first device;

sending an authentication request to a login terminal of the second user account bound with the device identification when the first user account is different from the second user account that is bound with the device identification of the second device, wherein the authentication request is used to request for allowing the first device to access the second device;

receiving a permission access response from the login terminal in response to the authentication request, the permission access response authorizing an access by the first device to the second device; and sending an access password associated with the device identification to the first device, wherein the first device accesses the second device according to the access password, wherein the second device receives the access password sent from the first device, and detects whether the received access password which is a first access password is the same as a second access password generated by the second device, wherein the second access password is periodically changed by the second device to obtain an updated second access password, and the updated second access password and the device identification of the second device is sent to the third-party device from the second device, so that the third-party device stores the updated second access password associated with the device identification, and wherein the first device, the second device, the third-party device, and the login terminal are physically remote from one another.

6. The method according to claim 5, wherein, the method further comprises:

detecting whether the device identification of the second device is bound with any user account; and binding the device identification with the first user account of the first device to assign the first device as the login terminal for the second device when the device identification is not bound with any user account.

7. The method according to claim 6, wherein, sending the authentication request to the login terminal of the second user account bound with the device identification when the first user account is different from the second user account that is bound with the device identification of the second device comprises:

detecting whether the first user account of the first device is the same as the second user account bound with the device identification when the device identification is bound with the second user account; and sending the authentication request to the login terminal of the second user account bound with the device identification when the first user account of the first device is different from the second user account bound with the device identification.

8. The method according to claim 7, wherein, the sending the access password associated with the device identification to the first device comprises:

sending the access password associated with the device identification to the first device when the first user account of the first device is the same as the second user account bound with the device identification.

9. The method according to claim 5, wherein, the method further comprises:

receiving the access password and the device identification of the second device sent from the second device; and storing the access password associated with the device identification of the second device when no access password is bound with the device identification of the second device.

10. The method according to claim 5, wherein, the method further comprises:

receiving the updated second access password and the device identification of the second device sent from the second device;

detecting whether the received updated second access password matches the second access password that is bound with the device identification of the second device in the third-party device; and binding the updated second access password with the device identification when the updated second access password is different from the second access password.

* * * * *